United States Patent
Nagata (10) Patent No.: US 9,278,671 B2
(45) Date of Patent: Mar. 8, 2016

(54) PARKING BRAKE DEVICE

(75) Inventor: Yasuhiro Nagata, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 14/375,936

(22) PCT Filed: Aug. 21, 2012

(86) PCT No.: PCT/JP2012/071103
§ 371 (c)(1),
(2), (4) Date: Jul. 31, 2014

(87) PCT Pub. No.: WO2013/114656
PCT Pub. Date: Aug. 8, 2013

(65) Prior Publication Data
US 2015/0020641 A1    Jan. 22, 2015

(30) Foreign Application Priority Data

Feb. 1, 2012 (JP) ................................. 2012-019490

(51) Int. Cl.
*B60T 7/04* (2006.01)
*B60T 7/06* (2006.01)
*G05G 5/06* (2006.01)
*G05G 1/44* (2008.04)

(52) U.S. Cl.
CPC . *B60T 7/045* (2013.01); *B60T 7/06* (2013.01); *G05G 5/06* (2013.01); *G05G 1/44* (2013.01); *Y10T 74/20528* (2015.01)

(58) Field of Classification Search
CPC ............ Y10T 74/20708; Y10T 74/20714; Y10T 74/20672–74/20702; Y10T 74/2141; Y10T 74/2138; Y10T 74/2137; Y10T 74/2136; Y10T 74/2135; Y10T 74/2133; Y10T 74/19898; Y10T 74/19907; Y10T 74/19967; B60T 74/045; B60T 74/047; B60T 74/04; B60T 74/104; B60T 74/105; G05G 5/06; G05G 5/18; G05G 5/24; G05G 1/44; G05G 1/445
See application file for complete search history.

(56) References Cited

U.S. PATENT DOCUMENTS 1,904,178 A * 4/1933 Vaughn ........................... 74/154
3,077,790 A * 2/1963 Wolfe .............................. 74/506
(Continued)

FOREIGN PATENT DOCUMENTS

JP        61-080158        5/1986

OTHER PUBLICATIONS

Office Action dated Nov. 4, 2015 in corresponding Chinese patent application No. 201280068874.X.

*Primary Examiner* — Daniel Yabut
(74) *Attorney, Agent, or Firm* — Finnegan, Henderson, Farabow, Garrett & Dunner, LLP (57) ABSTRACT

A parking brake apparatus includes: a braking member; a ratchet having a plurality of serrations and disposed on one of the braking member and a vehicle body-side member; a pawl rotatably disposed via a pawl pin on the other; and a pawl-urging spring. At start of braking, every time the pawl relatively climbs over the serration, the pawl is brought into contact with a non-locking surface side of the serration in accordance with an urging force of the pawl-urging spring. The pawl has a triangular engagement tooth that is inserted into a tooth groove of the ratchet, and a second side end surface facing the non-locking surface is covered with a synthetic resin except a tip portion of the engagement tooth. The non-locking surface is a concave surface concaved so as to be recessed from a straight line connecting a tooth tip and a tooth bottom of the serration.

2 Claims, 6 Drawing Sheets

(56) References Cited

U.S. PATENT DOCUMENTS

| | | | |
|---|---|---|---|
| 4,267,740 A * | 5/1981 | Schwarz | 74/128 |
| 5,303,610 A * | 4/1994 | Noel et al. | 74/535 |
| 6,289,766 B1 * | 9/2001 | Sukeshita et al. | 74/576 |
| 2006/0053952 A1 * | 3/2006 | Fujioka et al. | 74/527 |
| 2007/0068317 A1 * | 3/2007 | Krupin | 74/502.2 |

* cited by examiner

PRIOR ART

FIG.9

PRIOR ART

FIG.10

PRIOR ART

FIG.11

PRIOR ART

PARKING BRAKE DEVICE

CROSS-REFERENCE TO RELATED APPLICATIONS

This application is a national phase application of International Application No. PCT/JP2012/071103, filed Aug. 21, 2012, and claims the priority of Japanese Patent Application No. 2012-019490, filed Feb. 1, 2012, the content of both of which is incorporated herein by reference.

TECHNICAL FIELD

The invention relates generally to a parking brake apparatus, and more specifically to a technique for reducing operating noise generated by contact between a pawl and a ratchet at the start of braking.

BACKGROUND ART

There has been proposed a parking brake apparatus that includes (a) a braking member that is moved in one direction to pull a brake cable, thereby actuating a packing brake; (b) a ratchet that has a large number of serrations along a moving direction of the braking member, and that is disposed on one of the braking member and a vehicle body-side member; (c) a pawl that is rotatably disposed via a pawl pin on the other one of the braking member and the vehicle body-side member, and that is brought into contact with a locking surface side of the serration in accordance with a tensile force of the brake cable, thereby preventing the braking member from moving backward toward an original position in a direction opposite to the one direction; and (d) a pawl-urging spring that urges the pawl in such a rotational direction that the pawl engages with the ratchet, and in which (e) at the start of braking, at which the braking member is moved in the one direction, every time the pawl relatively climbs over the serration, the pawl is brought into contact with a non-locking surface side of the serration in accordance with an urging force of the pawl-urging spring, wherein (f) the pawl has a triangular engagement tooth that is inserted into a tooth groove of the ratchet, and a second side end surface that faces the non-locking surface of the serration is covered with a synthetic resin except a tip portion of the engagement tooth. In a foot-operated parking brake operation apparatus described in Patent Document 1, which is one example of the above-described parking brake apparatus, each of a pawl and a ratchet is made of a metal material, and a second side end surface of an engagement tooth of the pawl is covered with a synthetic resin, thereby reducing operating noise (successive hitting noise) generated by contact between the pawl and the ratchet at the start of braking, at which a braking member is moved in one direction (at the time of a brake operation of depressing a pedal).

PRIOR ART DOCUMENT

Patent Document

Patent Document 1: Japanese Utility Model Application Publication No. 61-80158

SUMMARY OF THE INVENTION

Problems to be Solved by the Invention

Figure 9:
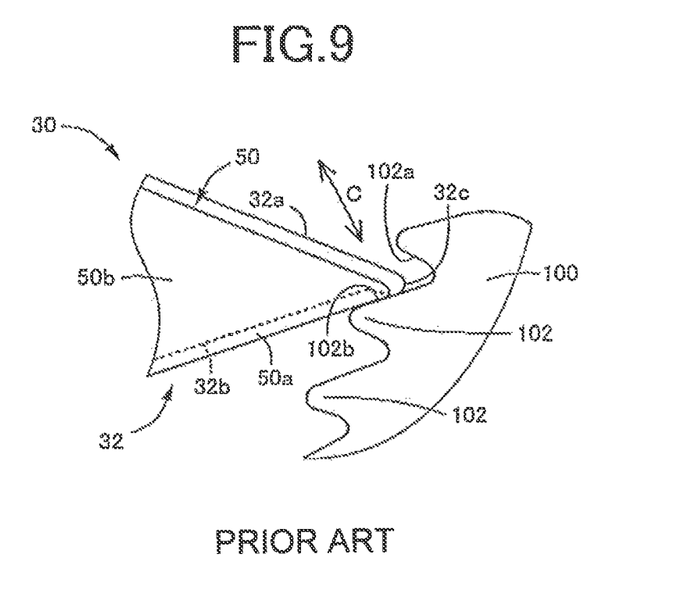
FIG. 9 is a view illustrating a comparative example in which a ratchet has a serration having a non-locking surface that is straight, the view being a side view corresponding to FIG. 3.
Figure 10:
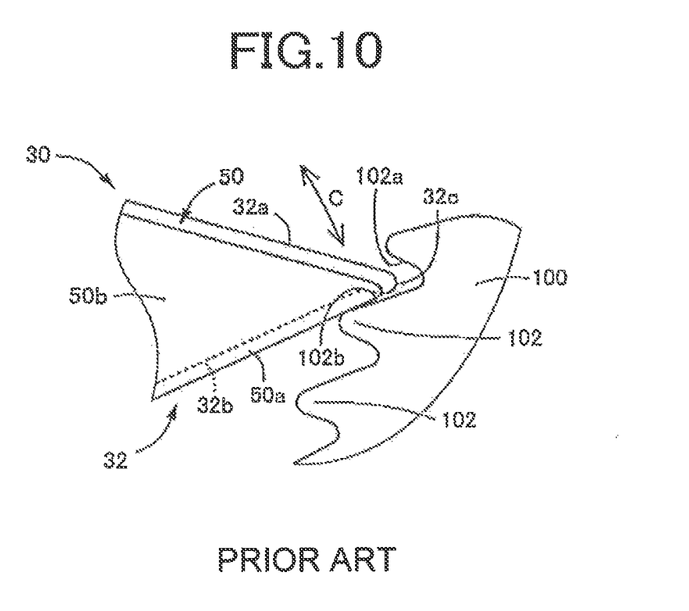
FIG. 10 is a side view illustrating the case where an angle of the engagement tooth is set so as not to contact the tip portion of the engagement tooth of the pawl with the non-locking surface in FIG. 9.

However, in the above-described parking brake apparatus, the tip portion of the engagement tooth of the pawl is exposed, and hence there is a possibility that a metal portion of the tip of the engagement tooth contacts the non-locking surface of the serration of the ratchet to generate large operating noise at the time of a brake operation. That is, for example, when a ratchet has a triangular chevron serration 102 having a locking surface 102a and a non-locking surface 102b that are flat (straight in a side view in FIG. 9), like a ratchet 100 illustrated in FIG. 9, a contact portion 50a of a synthetic resin film 50 that covers a second side end surface 32b is originally substantially parallel to the non-locking surface 102b of the serration 102, and hence a metal portion (a tip surface 32c) of the tip of an engagement tooth 32 contacts the non-locking surface 102b to generate hitting noise. Further, when slight wear or fatigue is caused in the contact portion 50a of the synthetic resin film 50, the tip surface 32c more easily contacts the non-locking surface 102b. In contrast to this, when the second side end surface 32b is tilted with respect to the non-locking surface 102b of the serration 102 as illustrated in FIG. 10, the contact portion 50a of the synthetic resin film 50 that covers the second side end surface 32b is brought into contact with a tooth tip portion of the serration 102, so that the tip surface 32c is prevented from contacting the non-locking surface 102b. However, when the brake operation is cancelled and thus the engagement tooth 32 relatively enters a tooth groove of the ratchet 100 as indicated by an arrow E in FIG. 11, the tip surface 32c is brought into contact with the locking surface 102a in an unsymmetrical contact state, and the contact portion 50a of the synthetic resin film 50 is pressed against the tooth tip portion of the serration 102. As a result, the durability of the synthetic resin film 50 is reduced.

The invention is made in light of the above-described circumstances, and one object of the invention is to further reliably reduce operating noise generated by contact between a pawl and a ratchet at the start of braking without reducing the durability of a synthetic resin.

Means for Solving the Problem

To achieve the object, the first aspect of the invention provides a parking brake apparatus that includes: (a) a braking member that is moved in one direction to pull a brake cable, thereby actuating a parking brake; (b) a ratchet that has a plurality of serrations along a moving direction of the braking member, and that is disposed on one of the braking member and a vehicle body-side member; (c) a pawl that is rotatably disposed via a pawl pin on the other one of the braking member and the vehicle body-side member, and that is brought into contact with a locking surface side of the serration in accordance with a tensile force of the brake cable, thereby preventing the braking member from moving backward toward an original position in a direction opposite to the one direction; and (d) a pawl-urging spring that urges the pawl in such a rotational direction that the pawl engages with the ratchet, wherein (e) at the start of braking, at which the braking member is moved in the one direction, every time the pawl relatively climbs over the serration, the pawl is brought into contact with a non-locking surface side of the serration in accordance with an urging force of the pawl-urging spring, the parking brake apparatus characterized in that (f) the pawl has a triangular engagement tooth that is inserted into a tooth groove of the ratchet, and a second side end surface that faces the non-locking surface of the serration is covered with a synthetic resin except a tip portion of the engagement tooth, and (g) the non-locking surface of the serration is a concave surface concaved so as to be recessed from a straight line that connects a tooth tip and a tooth bottom of the serration.

The second aspect of the invention provides the parking brake apparatus recited in the first aspect of the invention characterized in that: (a) the engagement tooth has the second side end surface, a first side end surface that faces the locking surface, and a circular-arc shaped tip surface that connects the first side end surface and the second side end surface to each other; and (b) the second side end surface is located at a position recessed by a prescribed dimension from a tangent to the tip surface at a point on the second side end surface side, and the synthetic resin covers the second side end surface such that the synthetic resin does not protrude from the tangent.

Effects of the Invention

In the parking brake apparatus as described above, the non-locking surface of the serration is the concave surface concaved so as to be recessed from the straight line that connects the tooth tip and the tooth bottom of the serration. Therefore, when the pawl relatively climbs over the serration to contact the non-locking surface side of the subsequent serration at the start of braking, at which the braking member is moved in the one direction, the synthetic resin that covers the second side end surface is brought into contact with the tooth tip portion on the non-locking surface side. Thus, the tip portion of the engagement tooth in which a material such as a metal is exposed, is appropriately prevented from contacting the non-locking surface. Thus, it is possible to reliably reduce the operating noise (successive hitting noise) generated by the contact with the non-locking surface side of the serration every time the pawl climbs over the serration of the ratchet at the start of braking.

Further, when the movement of the braking member to the one direction ends and then the braking member is moved backward in accordance with the tensile force of the brake cable, the engagement tooth of the pawl enters the tooth groove of the ratchet. However, a concave surface shape of the non-locking surface of the serration is appropriately determined, so that the tip portion of the engagement tooth in which a material such as a metal is exposed, is brought into contact with the tooth bottom portion between a locking surface and the non-locking surface and the synthetic resin that covers the second side end surface is kept apart from the tooth tip portion on the non-locking surface side. Thus, it is possible to reliably prevent the braking member from further moving backward, thereby appropriately maintaining the operation state of the parking brake. Further, it is also possible to prevent the situation where an excessive load acts on the synthetic resin that covers the second side end surface and thus the durability is reduced.

In the second aspect of the invention, the second side end surface covered with the synthetic resin is located at the position recessed by the prescribed dimension from the tangent to the tip surface at the point on the second side end surface side, and the synthetic resin covers the second side end surface such that the synthetic resin does not protrude from the tangent. Therefore, when the movement of the braking member to the one direction ends and then the braking member is moved backward in accordance with the tensile force of the brake cable and the engagement tooth of the pawl enters the tooth groove of the ratchet, the synthetic resin is inhibited from being caught on the tooth tip portion of the serration and thus the synthetic resin is inhibited from being peeled of or curling up. As a result, the durability of the synthetic resin is further enhanced.

MODES FOR CARRYING OUT THE INVENTION

The invention is suitably applied to a foot-operated or hand-operated parking brake operation apparatus including an operating member such as an operation pedal or an operating lever as the braking member, but is applicable to an automatic parking brake apparatus that moves the braking member with the use of a drive device such as an electric motor by a driver's switch operation or the like. For example, the braking member is disposed so as to be pivotable about a prescribed support axis, and pivoted about the support axis to pull the brake cable, thereby actuating the parking brake. However, the braking member may be moved to reciprocate in a direction along a straight line.

When the braking member is pivoted about the support axis, the ratchet is disposed along a circular-arc shape around the support axis. When the braking member is moved so as to reciprocate in the direction along the straight line, the ratchet is disposed along the straight line. The serrations of the ratchet are tilted teeth, and are formed so as to tilt in such a direction that the movement of the braking member at the start of braking is allowed. That is, when the ratchet is disposed on the braking member, the serrations are tilted in a direction opposite to the one direction that is a moving direction of the braking member, and when the ratchet is disposed on the vehicle body-side member, the serrations are tilted in the one direction that is the moving direction of the braking member. Further, a side of each serration on a tilt direction side is a locking surface to be engaged with the pawl in accordance with a tensile force of the brake cable at the time of actuation of the brake, and a side thereof on an the opposite side from the tilt direction side is a non-locking surface. The pawl and the ratchet are made of for example, a metal material, but may be made of another material that has a high hardness and causes a problem of operating noise (hitting noise) at the start of braking. In the case of the parking brake operation apparatus to be operated by the driver, the start time of braking is the time of a brake operation such as a depressing operation of the operation pedal or a palling-up operation of the operating lever.

The vehicle body-side member is, for example, a bracket that is fixedly fitted to a vehicle body and by which the braking member is movably supported. The ratchet is disposed on one of the vehicle body-side member and the braking member, and the pawl is disposed on the other member. The pawl is urged in such a rotational direction as to engage with the ratchet by the pawl-urging spring such as a torsional coil spring, a compressive coil spring or a tensile coil spring. The braking member is provided with a return spring such as a torsional coil spring or a tensile coil spring as needed to move the braking member backward to the original position. However, the return spring is not required, for example, when the operating lever (the braking member) is pivoted backward by a driver's hand operation as in the hand-operated parking brake operation apparatus. That is, the return spring may be disposed if necessary.

The second side end surface of the engagement tooth of the pawl is covered with the synthetic resin except the tip portion of the engagement tooth. This is because when the engagement tooth is engaged with the serration of the ratchet in accordance with the tensile force of the brake cable at the time of cancellation of the brake operation or the like, a material such as a metal directly contacts the tooth bottom and the like, so that the operation state of the parking brake is appropriately maintained. The tip portion of the engagement tooth is preferably formed into a circular-arc shape as in, for example, the second aspect of the invention. Further, the second side end surface is covered with the synthetic resin. Thus, it is possible to reduce the hitting noise when the pawl climbs over the serration and is brought into contact with the non-locking surface of the subsequent serration, at the start of braking, at which the braking member is moved in the one direction. Film thickness and material of the synthetic resin is suitably determined so as to obtain prescribed impact absorbing performance and durability. The synthetic resin may be formed integrally with the pawl by insert molding or the like. However, the synthetic resin may be secured to the pawl later by an adhesive or the like, or attached to the pawl with the use of fixing means such as screws or rivets.

The non-locking surface of each serration is a concave surface concaved so as to be recessed from a straight line that connects the tooth tip and the tooth bottom of the serration to each other. The non-locking surface is preferably, for example, a concavely curved surface smoothly curved into a circular-arc shape or the like. Each of the tooth bottom and the tooth tip of the serration preferably has a smoothly curved shape such as a circular-arc shape. When the tip of the engagement tooth of the pawl has a circular-arc shape, preferably, the tooth bottom of the serration also has a circular-arc shape with substantially the same radial dimension so as to correspond to the engagement tooth, so that the engagement tooth is stably engaged with the tooth bottom portion of the serration.

In the second aspect of the invention, the second side end surface is located at the position recessed by the prescribed dimension from the tangent to the circular-arc shaped tip surface at the point on the second side end surface side, and the synthetic resin is disposed so that the synthetic resin does not protrude from the tangent. However, when the first aspect of the invention is implemented, the second side end surface may be disposed along the tangent to the circular-arc shaped tip surface, and the synthetic resin may be formed so as to protrude from the tangent.

EMBODIMENT

Hereinafter, an embodiment of the invention will be described in detail with reference to the drawings.

Figure 1:
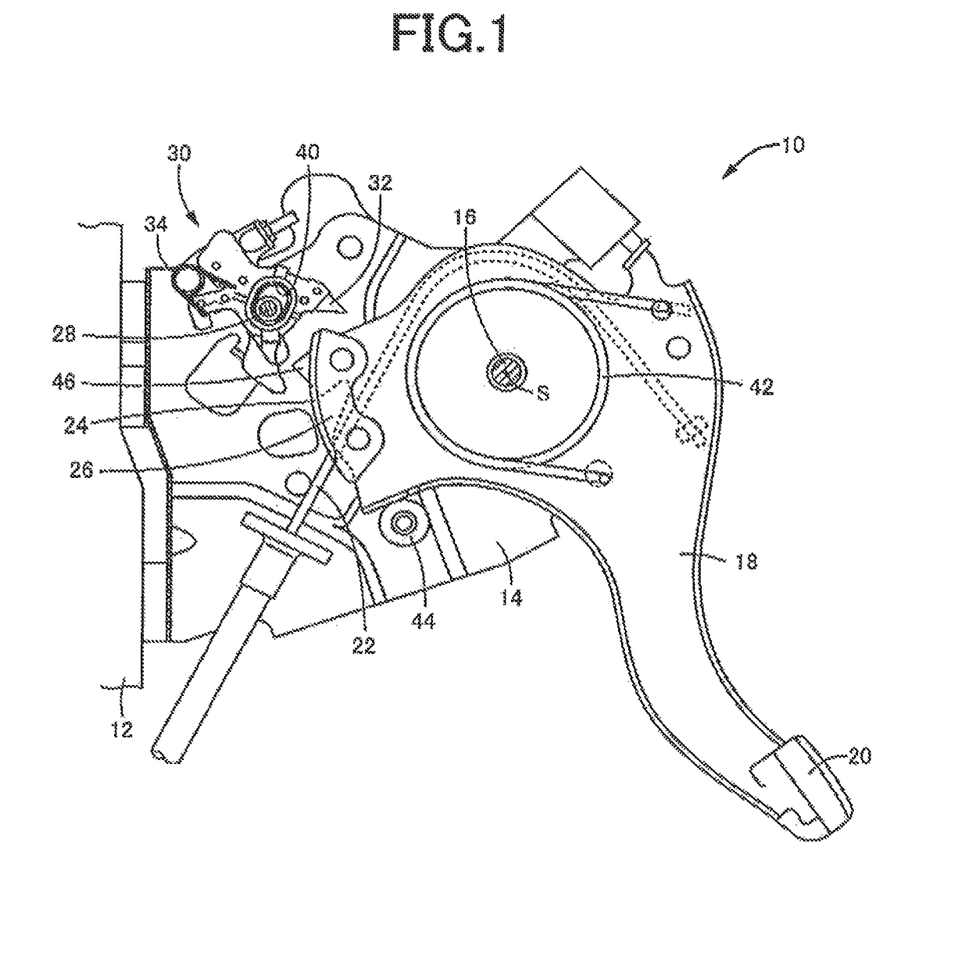
FIG. 1 is a schematic view illustrating a foot-operated parking brake operation apparatus according to an embodiment of the invention, and is a partially cutaway side view of the foot-operated parking brake operation apparatus.

FIG. 1 is a schematic view illustrating a foot-operated parking brake operation apparatus 10 according to an embodiment of the invention, and is a partially cutaway side view of the foot-operated parking brake operation apparatus 10 mounted in a vehicle as viewed from one side (left side) of the vehicle. The foot-operated parking brake operation apparatus 10 includes an operation pedal 18 disposed on a bracket 14 disposed at a fixed position of a vehicle body 12, which is in front of a driving seat, so as to be pivotable about an axis S of a support shaft 16. A pedal pad 20 is disposed at a lower end portion of the operation pedal 18. When the pedal pad 20 is depressed by a driver, the operation pedal 18 is pivoted clockwise about the support shaft 16 to pull a brake cable 22, thereby actuating a parking brake disposed in a wheel (not illustrated). The foot-operated parking brake operation apparatus 10 corresponds to a parking brake apparatus, the operation pedal 18 corresponds to a braking member, and the clockwise pivot motion about the support shaft 16 corresponds to movement in one direction.

A ratchet 26 having a large number of serrations 24 along a circular-arc shape around the axis S is attached to an upper front portion of the operation pedal 18, and is engaged with an engagement tooth 32 of a pawl 30 rotatably disposed on the bracket 14 via a pawl pin 28 parallel to the axis S, thereby preventing a returning pivot motion of the operation pedal 18 toward an original position to maintain an operation state of the parking brake. The pawl 30 is urged to rotate in the clockwise direction around the pawl pin 28 by a torsional coil spring 34 of which the opposite end portions are hooked on the pawl 30 and the bracket 14, and the engagement tooth 32 is engaged with the serration 24 of the ratchet 26. The torsional coil spring 34 corresponds to a pawl-urging spring.

Figure 2:
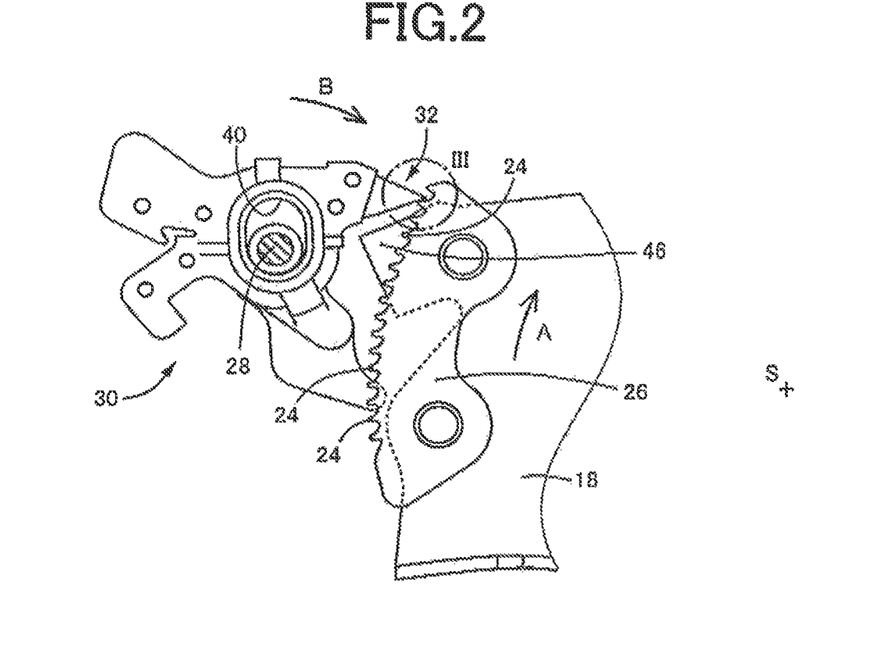
FIG. 2 is an enlarged side view illustrating an engagement portion of a pawl with a ratchet when an operation pedal is depressed, in the embodiment of FIG. 1.
Figure 3:
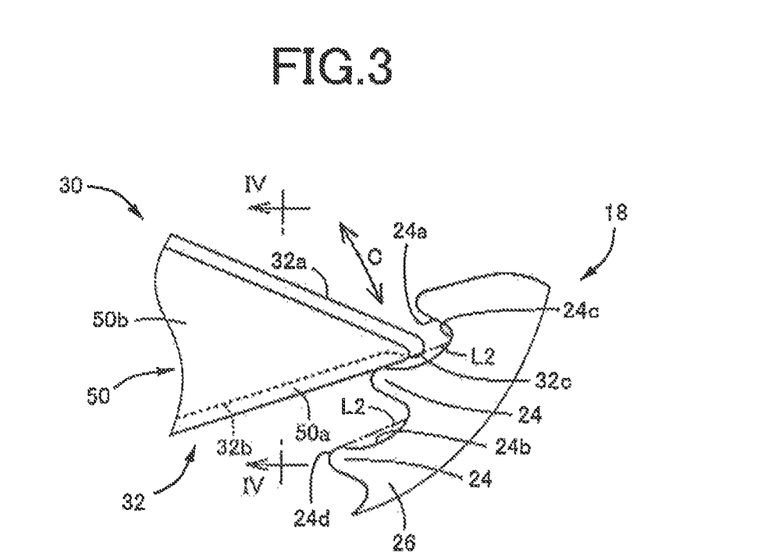
FIG. 3 is an enlarged side view illustrating a portion III in FIG. 2.
Figure 6:
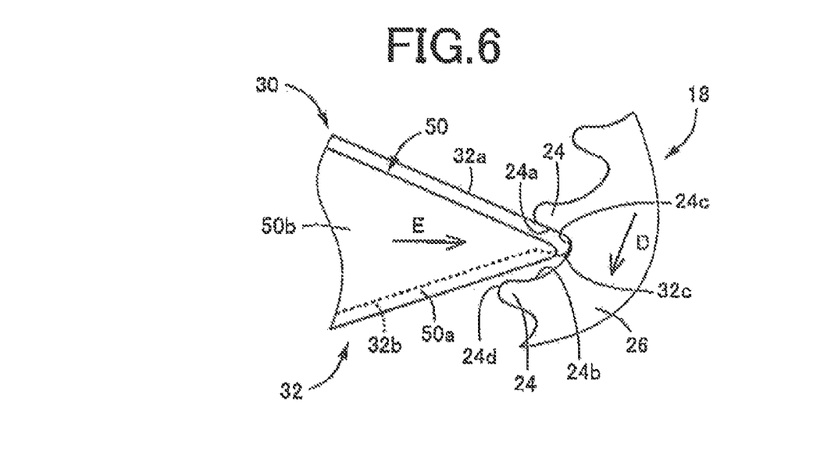
FIG. 6 is a side view illustrating the state where a depressing operation of the operation pedal is cancelled and thus the engagement tooth of the pawl is engaged with the ratchet, in the embodiment of FIG. 1.

As it is clear from FIG. 2 and FIG. 3 illustrating an enlarged portion III in FIG. 2, the serrations 24 of the ratchet 26 are tilted teeth that are tilted in a direction opposite to a pivoting direction A in which the operation pedal 18 pivots about the axis S during the depressing operation of the operation pedal 18, and the pawl 30 urged in a direction indicated by an arrow B by the torsional coil spring 34 is allowed to climb over each serration 24 while moving as indicated by an arrow C against an urging force of the torsional coil spring 34. Then, when application of a depressing operation force to the operation pedal 18 is cancelled, the operation pedal 18 is pivoted backward in the counterclockwise direction indicated by an arrow D in accordance with a tensile force of the brake cable 22 as illustrated in FIG. 6. Further, the triangular engagement tooth 32 relatively enters a tooth groove of the ratchet 26 as indicated by an arrow E, and is brought into contact with a locking surface 24a and a tooth bottom surface 24c of the serration 24, thereby preventing a further returning pivot motion of the operation pedal 18, to maintain the operation state of the parking brake. Each of the ratchet 26 and the pawl 30 is made of a metal material, and the locking surface 24a and a first side end surface 32a of the engagement tooth 32 that faces the locking surface 24a are flat surfaces each having a linear shape in a side view illustrated in FIG. 6 and are brought into substantially close contact with each other. Further, the tooth bottom surface 24c and a tip surface 32c of the engagement tooth 32 are cylindrical surfaces having a circular-arc shape with substantially the same curvature in a side view and are brought into substantially close contact with each other, so that a locked state, that is, the operation state of the parking brake is stably maintained.

The pawl pin 28 is passed through a long hole 40 formed in the pawl 30. When the engagement tooth 32 of the pawl 30 is engaged with the serration 24 of the ratchet 26 as illustrated in FIG. 6, a rotation center of the pawl 30 is changed by the tensile force of the brake cable 22. Further, the direction of urging by the torsional coil spring 34 is reversed. Thus, when the operation pedal 18 is depressed again to cancel the engagement with the ratchet 26, the pawl 30 is pivoted counterclockwise about the pawl pin 28 in accordance with the urging force of the torsional coil spring 34, so that the engagement with the ratchet 26 becomes impossible. The operation pedal 18 is urged to pivot in the counterclockwise direction about the axis S by a torsional coil spring 42 (see FIG. 1) of which the opposite end portions are hooked on the operation pedal 18 and the bracket 14, and is pivoted backward to the original position illustrated in FIG. 1 in accordance with the urging force of the torsional coil spring 42 and the tensile force of the brake cable 22. The original position of the operation pedal 18 is determined by a stopper 44 attached to the bracket 14. Further, when the operation pedal 18 is pivoted backward to the original position, a return engaging portion 46 is engaged with the pawl 30. Thus, the pawl 30 is pivoted clockwise about the pawl pin 28, and the rotation center is returned to an initial position illustrated in FIG. 1 and FIG. 2. Further, the direction of urging by the torsional coil spring 34 is returned to the clockwise direction. The torsional coil spring 42 corresponds to a return spring. Note that, another release mechanism that pivots the pawl 30 counterclockwise about the pawl pin 28 to cancel the engagement with the ratchet 26 may be adopted.

Figure 4:
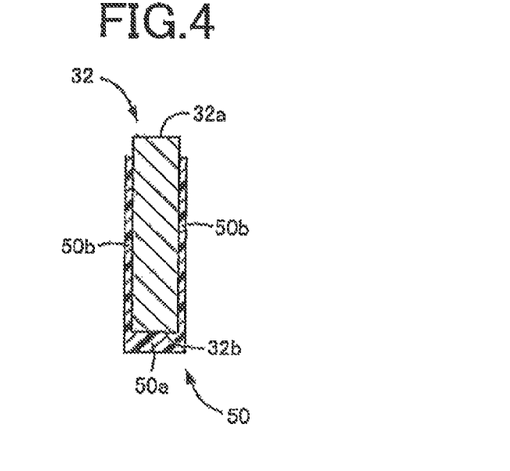
FIG. 4 is a sectional view taken along the line IV-IV in FIG. 3.

When the operation pedal 18 is depressed to actuate the parking brake, the pawl 30 successively climbs over the serrations 24 of the ratchet 26 while moving as indicated by the arrow C in FIG. 3, but is brought into contact with a non-locking surface 24b side of the subsequent serration 24 in accordance with the urging force of the torsional coil spring 34 as illustrated in FIG. 3. Therefore, every time the engagement tooth 32 of the pawl 30 climbs over each of the large number of serrations 24, the engagement tooth 32 contacts the serration 24 to generate operating noise (successive hitting noise). In this case, in the present embodiment, a synthetic resin film 50 is formed on a second side end surface 32b that faces the non-locking surface 24b of the serration 24, out of a pair of the first side end surface 32a and the second side end surface 32b of the triangular engagement tooth 32, and the synthetic resin film 50 is brought into contact with the serration 24, so that an impact is absorbed to reduce the operating noise. As it is clear from FIG. 4 illustrating a section taken along the line IV-IV in FIG. 3, the synthetic resin film 50 has a U-shaped sectional shape so as to wrap around the second side end surface 32b side of the engagement tooth 32, and has a thick contact portion 50a located on the second side end surface 32b and a pair of side wall portions 50b located on side surfaces of the engagement tooth 32. The synthetic resin film 50 is formed integrally with the engagement tooth 32 simultaneously with its formation by, for example, insert molding or the like. However, the synthetic resin film 50 may be bonded to the engagement tooth 32 by an adhesive or fixed to the engagement tooth 32 by fixing means such as rivets, as needed.

The synthetic resin film 50 is formed on a portion of the engagement tooth 32 except the first side end surface 32a and the tip surface 32c. In the locked state illustrated in FIG. 6, the first side end surface 32a and the tip surface 32c made of the metal and exposed on the outside of the synthetic resin film 50 are brought into direct contact with the locking surface 24a and the tooth bottom surface 24c of the serration 24 of the ratchet 26. Thus, it is possible to obtain the stably locked state where the parking brake does not loosen.

Figure 5:
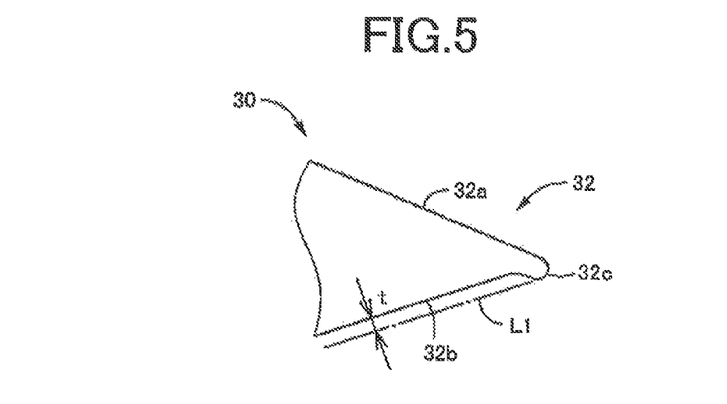
FIG. 5 is a side view illustrating the state before an engagement tooth of the pawl is covered with a synthetic resin, in the embodiment of FIG. 1.
Figure 7:
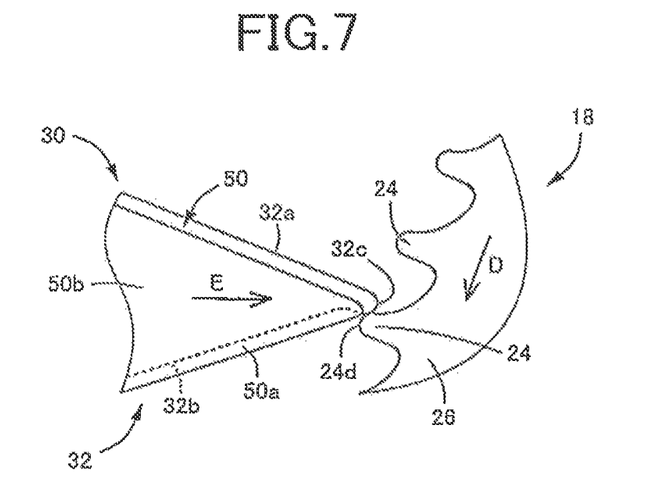
FIG. 7 is a side view illustrating the state just before a depressing operation of the operation pedal is cancelled and thus the engagement tooth of the pawl enters a tooth groove of the ratchet, in the embodiment of FIG. 1.
Figure 8:
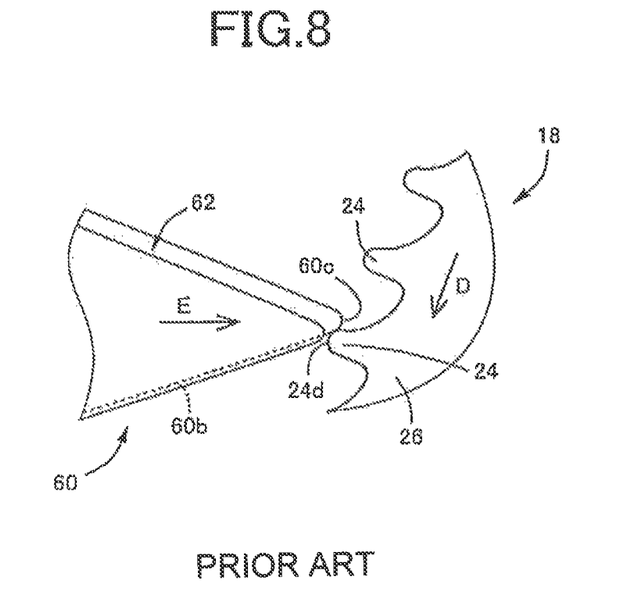
FIG. 8 is a view illustrating the state just before a depressing operation of the operation pedal is cancelled and thus an engagement tooth of the pawl enters a tooth groove of the ratchet when a second side end surface of the engagement tooth is located on a tangent to a circular-arc shaped tip surface and a synthetic resin that covers the second side end surface is formed to protrude from the tangent, the view being a side view corresponding to FIG. 7.

Further, as illustrated in FIG. 5, the second side end surface 32b of the engagement tooth 32 is located at a position recessed by a prescribed dimension t from a tangent L1 to the tip surface 32c at a point on the second side end surface 32b side. The tangent L1 is a tangent parallel to the second side end surface 32b. Further, the synthetic resin film 50 is formed so as not to protrude from the tangent L1. In the present embodiment, the synthetic resin film 50 is formed such that thickness of the contact portion 50a of the synthetic resin film 50 is substantially equal to the recessed dimension t, that is, a surface of the contact portion 50a substantially coincides with the tangent L1. Thus, when a brake operation is cancelled in a state where the tip surface 32c of the engagement tooth 32 is in contact with a tooth tip surface 24d of the serration 24 as illustrated in, for example, FIG. 7, so that the operation pedal 18 is pivoted backward in the counterclockwise direction indicated by the arrow D in accordance with the tensile force of the brake cable 22 and the engagement tooth 32 relatively enters the tooth groove of the ratchet 26 as indicated by the arrow B, the synthetic resin film 50 is inhibited from being caught on a tooth tip portion of the serration 24 and thus the synthetic resin film 50 is inhibited from being peeled off or curling up. That is, when a second side end surface 60b is located at a position that coincides with the tangent L1 and a synthetic resin film 62 is formed to cover the second side end surface 60b as in the case of an engagement tooth 60 illustrated in FIG. 8, the synthetic resin film 62 protrudes by an amount corresponding to the film thickness from a tip surface 60c of the engagement tooth 60. Therefore, when the engagement tooth 60 relatively enters the tooth groove of the ratchet 26 as indicated by the arrow B, the synthetic resin film 62 is easily caught on the tooth tip portion of the serration 24. Further, in the present embodiment, the tooth tip surface 24d of the serration 24 is a cylindrical surface having a circular-arc shape in a side view, and hence the synthetic resin film 50 is further effectively inhibited from being caught on the tooth tip portion of the serration 24. Note that the case where the synthetic resin film 62 protrudes from the tangent L1 (substantially the same as the second side end surface 60b) to the tip surface 60c as in FIG. 8 is also one mode of the invention. For example, when the protrusion is made smaller by reducing the film thickness of the synthetic resin film 62, the synthetic resin film is inhibited from being caught on the tooth tip portion of the serration 24.

Figure 11:
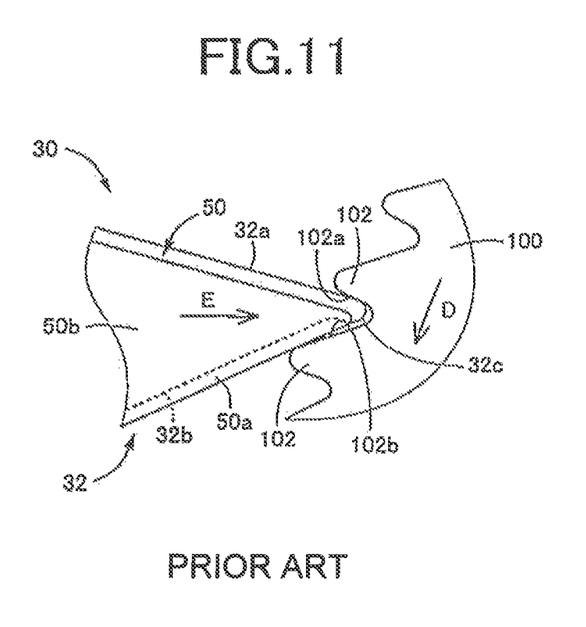
FIG. 11 is a view illustrating the state where a depressing operation of the operation pedal is cancelled and thus the engagement tooth is engaged with the ratchet in the case of FIG. 10 the view being a side view corresponding to FIG. 6.

On the other hand, even when the second side end surface 32b of the engagement tooth 32 is covered with the synthetic resin film 50 as described above, the tip surface 32c is exposed to stably maintain the locked state. Therefore, for example, when a ratchet has a triangular chevron serration 102 having a locking surface 102a and a non-locking surface 102b that are flat (straight in a side view in FIG. 9), like a ratchet 100 illustrated in FIG. 9, there is a possibility that the metal portion of the tip of the engagement tooth 32 will contact the non-locking surface 102b of the serration 102 of the ratchet 100 to generate large operating noise during a brake operation. That is, when the second side end surface 32b covered with the synthetic resin film 50 is substantially parallel to the non-locking surface 102b of the serration 102, the metal portion (tip surface 32c) of the tip of the engagement tooth 32 contacts the non-locking surface 102b to generate hitting noise. When slight wear or fatigue is caused in the contact portion 50a of the synthetic resin film 50, the tip surface 32c more easily contacts the non-locking surface 102b. When the second side end surface 32b is tilted with respect to the non-locking surface 102b of the serration 102 as illustrated in FIG. 10, the contact portion 50a of the synthetic resin film 50 that covers the second side end surface 32b is brought into contact with a tooth tip portion of the serration 102, so that the tip surface 32c is prevented from contacting the non-locking surface 102b. However, when the brake operation is cancelled and thus the engagement tooth 32 relatively enters a tooth groove of the ratchet 100 as illustrated in FIG. 11, the tip surface 32c is brought into contact with the locking surface 102a in an unsymmetrical contact state, and the contact portion 50a of the synthetic resin film 50 is pressed against the tooth tip portion of the serration 102. As a result, the durability of the synthetic resin film 50 is reduced.

On the other hand, as it is clear from FIG. 3, in the present embodiment, the non-locking surface 24b of the serration 24 is a concavely curved surface concaved into a smooth circular-arc shape so as to be recessed from a straight line L2 that connects the tooth bottom surface 24c and the tooth tip surface 24d of the serration 24 to each other. Therefore, the tip surface 32c exposed on the outside of the synthetic resin film 50 is appropriately prevented from contacting the non-locking surface 24b of the serration 24 at the time of the brake operation. Further, the concavely curved surface of the non-locking surface 24b is appropriately determined, so that it is possible to easily set such a configuration that, when the brake operation is cancelled and thus the engagement tooth 32 enters the tooth groove of the ratchet 26 as illustrated in FIG. 6, the tip surface 32c is brought into contact with the tooth bottom surface 24c of the serration 24 and the contact portion 50a of the synthetic resin film 50 that covers the second side end surface 32b is kept apart from the tooth tip surface 24d. Thus, it is possible to ensure the stably locked state by the contact between the tip surface 32c of the engagement tooth 32 and the tooth bottom surface 24c, and it is also possible to appropriately reduce the operating noise at the time of the brake operation without reducing the durability of the synthetic resin film 50.

As described above, in the foot-operated parking brake operation apparatus 10 in the present embodiment, the non-locking surface 24b of the serration 24 is the concavely curved surface concaved so as to be recessed from the straight line L2 that connects the tooth tip surface 24d and the tooth bottom surface 24c of the serration 24 to each other. Therefore, when the pawl 30 relatively climbs over the serration 24 to contact the non-locking surface 24b side of the subsequent serration 24 at the time of the brake operation of depressing the operation pedal 18, the contact portion 50a of the synthetic resin film 50 that covers the second side end surface 32b is brought into contact with the tooth tip portion (the tooth tip surface 24d) on the non-locking surface 24b side as illustrated in FIG. 3. Thus, the tip surface 32c of the engagement tooth 32, which is made of the metal and exposed on the outside of the synthetic resin film 50, is appropriately prevented from contacting the non-locking surface 24b. Thus, it is possible to reliably reduce the operating noise (successive hitting noise) generated by the contact with the non-locking surface 24b side of the serration 24 every time the pawl 30 climbs over the serration 24 of the ratchet 26 at the time of the brake operation.

Further, when the depressing operation of the operation pedal 18 ends and thus application of the depressing operation force is cancelled, the operation pedal 18 is moved backward in accordance with the tensile force of the brake cable 22 as indicated by the arrow D in FIG. 6, and the engagement tooth 32 of the pawl 30 enters the tooth groove of the ratchet 26. However, a concave surface shape of the non-locking surface 24b of the serration 24 is appropriately determined, so that the tip surface 32c made of the metal and exposed on the outside of the synthetic resin film 50 is brought into contact with the tooth bottom surface 24c of the serration 24 and the contact portion 50a of the synthetic resin film 50 that covers the second side end surface 32b is kept apart from the tooth tip surface 24d. Thus, it is possible to reliably prevent the returning pivot motion of the operation pedal 18, thereby appropriately maintaining the operation state of the parking brake. Further, it is also possible to prevent the situation where an excessive load acts on the contact portion 50a of the synthetic resin film 50 that covers the second side end surface 32b and thus the durability is reduced.

Further, in the present embodiment, the second side end surface 32b covered with the synthetic resin film 50 is located at the position recessed by the prescribed recess dimension t from the tangent L1 to the circular-arc shaped tip surface 32c at the point on the second side end surface 32b side, and the synthetic resin film 50 covers the second side end surface 32b such that the synthetic resin film 50 does not protrude from the tangent L1. Therefore, when the depressing operation of the operation pedal 18 is cancelled and thus the operation pedal 18 is pivoted backward in accordance with the tensile force of the brake cable 22 and the engagement tooth 32 of the pawl 30 enters the tooth groove of the ratchet 26, the contact portion 50a of the synthetic resin film 50 is inhibited from being caught on the tooth tip portion of the serration 24 (tooth tip surface 24d) and thus the synthetic resin film 50 is inhibited from being peeled off or curling up. As a result, the durability of the synthetic resin film 50 is further enhanced.

While the embodiment of the invention has been described in detail with reference to the drawings, the embodiment is just one mode of the invention. The invention may be implemented in various modes achieved by making various changes and improvements based on the knowledge of a person skilled in the art.

NOMENCLATURE OF ELEMENTS

10: foot-operated parking brake apparatus (parking brake apparatus) 14: bracket (vehicle body-side member) 18: operation pedal (braking member) 22: brake cable 24: serrations 24a: locking surface 24b: non-locking surface 24c: tooth bottom surface (tooth bottom) 24d: tooth tip surface (tooth tip) 26: ratchet 28: pawl pin 30: pawl 32, 60: engagement tooth 32a: first side end surface 32b, 60b: second side end surface 32c, 60c: tip surface 34: torsional coil spring (pawl-urging spring) 50, 62: synthetic resin film (synthetic resin) L1: tangent L2: straight line that connects the tooth bottom and the tooth tip of the serration t: recessed dimension of the second side end surface.

The invention claimed is:
1. A parking brake apparatus comprising:
a braking member that is moved in one direction to pull a brake cable, thereby actuating a parking brake;

a ratchet that has a plurality of serrations along a moving direction of the braking member, and that is disposed on one of the braking member and a vehicle body-side member;

a pawl that is rotatably disposed via a pawl pin on the other one of the braking member and the vehicle body-side member, and that is brought into contact with a locking surface side of the serration in accordance with a tensile force of the brake cable, thereby preventing the braking member from moving backward toward an original position in a direction opposite to the one direction; and a pawl urging spring that urges the pawl in such a rotational direction that the pawl engages with the ratchet;

and at the start of braking, at which the braking member is moved in the one direction, every time the pawl relatively climbs over the serration, the pawl being brought into contact with a non-locking surface side of the serration in accordance with an urging force of the pawl-urging spring, the parking brake apparatus being further configured such that the pawl has a triangular engagement tooth that is inserted into a tooth groove of the ratchet, the engagement tooth has a first side end surface that faces the locking surface, a second side end surface that faces the non-locking surface of the serration and that is covered with a synthetic resin except a tip portion of the engagement tooth, and a circular-arc shaped tip surface that connects the first side end surface and the second side end surface to each other, the non-locking surface of the serration is a concave surface concaved so as to be recessed from a straight line that connects a tooth tip and a tooth bottom of the serration, and the second side end surface is located at a position recessed by a prescribed dimension from a tangent to the tip surface at a point on a side of the second side end surface.

2. The parking brake apparatus according to claim 1, wherein the synthetic resin covers the second side end surface such that the synthetic resin does not protrude from the tangent.

* * * * *